US009843831B2

(12) United States Patent
Mangla et al.

(10) Patent No.: US 9,843,831 B2
(45) Date of Patent: Dec. 12, 2017

(54) UNIVERSAL REMOTE CONTROL WITH OBJECT RECOGNITION

(71) Applicant: Texas Instruments Incorporated, Dallas, TX (US)

(72) Inventors: Mayank Mangla, Dallas, TX (US); Venkat Ramana Peddigari, Andhra Pradesh (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 680 days.

(21) Appl. No.: 13/875,216

(22) Filed: May 1, 2013

(65) Prior Publication Data

US 2014/0327782 A1 Nov. 6, 2014

(51) Int. Cl.

| | |
|---|---|
| ***H04N 21/422*** | (2011.01) |
| ***H04N 5/44*** | (2011.01) |
| ***H04N 21/4223*** | (2011.01) |
| ***H04N 21/433*** | (2011.01) |
| ***H04N 21/44*** | (2011.01) |
| ***H04N 21/472*** | (2011.01) |
| ***H04N 21/81*** | (2011.01) |

(52) U.S. Cl.

CPC ..... *H04N 21/42204* (2013.01); *H04N 5/4403* (2013.01); *H04N 21/4223* (2013.01); *H04N 21/4332* (2013.01); *H04N 21/44008* (2013.01); *H04N 21/472* (2013.01); *H04N 21/8153* (2013.01); *G08C 2201/20* (2013.01); *G08C 2201/92* (2013.01); *H04N 2005/4428* (2013.01); *H04N 2005/4432* (2013.01)

(58) Field of Classification Search

CPC ..... G06F 3/00; G06F 9/4411; G08C 2201/20; G08C 2201/92; G08C 2201/21; H04N 21/42222; H04N 2005/4428; H04N 2005/4423; H04N 2005/4425; H04N 21/4223; G05B 2219/23051; G05B 2219/24097

See application file for complete search history.

(56) References Cited

U.S. PATENT DOCUMENTS

| | | | | |
|---|---|---|---|---|
| 6,763,148 B1 * | 7/2004 | Sternberg | G06F 17/30247 | 382/293 |
| 8,766,783 B1 * | 7/2014 | Hughes | H04N 21/25833 | 340/12.3 |
| 2004/0208588 A1 * | 10/2004 | Colmenarez | G08C 19/28 | 398/115 |
| 2007/0013775 A1 * | 1/2007 | Shin | G08C 17/02 | 348/114 |

(Continued)

FOREIGN PATENT DOCUMENTS

WO WO 2005043484 A1 * 5/2005 ............. G08C 19/28

*Primary Examiner* — Nay Tun

(74) *Attorney, Agent, or Firm* — Kenneth Liu; Charles A. Brill; Frank D. Cimino

(57) ABSTRACT

Embodiments utilize a camera on a universal remote control to automatically detect which device the remote is pointed at by the user. The image captured by the camera is compared to a database of images of known or preconfigured devices that can be controlled by the universal remote control. If the image captured by the camera matches an image in the database, then the universal remote control loads a specific key map for the preconfigured device from the database.

20 Claims, 4 Drawing Sheets

102 103 104 105 FM102.7 106 CAMERA COMMAND TRANSMITTER 107 110 101 109 1 2 3 4 5 6 7 8 9 0 CH VOL AUDIO SENSOR 111 PROCESSOR 108 MEMORY 112 NETWORK TRANSMITTER 113 EXTERNAL INTERFACE 114 EXTERNAL NETWORK 115 REFERENCE DATABASE 116

(56) References Cited

U.S. PATENT DOCUMENTS

| | | | | |
|---|---|---|---|---|
| 2007/0210932 | A1* | 9/2007 | Koshiba | G08C 23/04 340/12.22 |
| 2007/0271267 | A1* | 11/2007 | Lim | G08C 19/28 |
| 2008/0297372 | A1* | 12/2008 | Wouters | G08C 19/28 340/12.23 |
| 2009/0013770 | A1* | 1/2009 | Proksch | G01Q 60/24 73/105 |
| 2009/0013857 | A1* | 1/2009 | Ramstein | G10H 1/32 84/645 |
| 2009/0015583 | A1* | 1/2009 | Starr | G06T 13/205 345/419 |
| 2009/0285443 | A1* | 11/2009 | Camp, Jr. | G08C 23/04 382/100 |
| 2010/0281066 | A1* | 11/2010 | Haughawout | G08C 19/28 707/802 |
| 2012/0068857 | A1* | 3/2012 | Rothkopf | G08C 19/28 340/870.07 |
| 2012/0206245 | A1* | 8/2012 | Uno | G08C 17/02 340/12.26 |
| 2012/0299709 | A1* | 11/2012 | Nishimura | G05B 19/0426 340/12.23 |
| 2013/0007289 | A1* | 1/2013 | Seo | G06F 3/038 709/227 |

* cited by examiner

UNIVERSAL REMOTE CONTROL WITH OBJECT RECOGNITION

BACKGROUND

Audiovisual equipment, such as televisions (TV), DVD players, and stereo equipment, is often provided with a remote control that is specifically configured to control that equipment. Universal remote controls (URCs) are not associated with a particular brand or device but instead may be programmed to operate one or more devices using a single unit. URCs allow a user to consolidate multiple dedicated remotes into one device, which is useful for managing various brands and types of devices that are commonly used at the same time, such as TV, DVD player, cable box, and the like.

A typical URC is a handheld device with a numeric keypad, recording control buttons (e.g., play, pause, stop, rewind, fast-forward, etc.), and buttons to select various types of equipment (e.g., TV, DVD player, cable box, stereo, etc.). In addition to dedicated remote control devices, smartphones and tablet computers may operate as a remote control or URC, for example, if a remote-control application has been loaded on the smartphone or tablet or if hardware and/or software upgrades have been installed.

Existing URCs rely on manual selection of the device to be controlled by the remote. For example, to control a television, the user must press a "TV" button before the URC will emit commands to operate the television in response to user inputs. To switch control of a DVD player, the user must press a "DVD" button. The URC will then emit commands to control the DVD player in response to user inputs, but will no longer control the television. In existing URCs, there is no intelligence to automatically detect which device a user is trying to control. The user must manually select the desired device before inputting commands to control that device.

Additionally, existing URC devices must be manually programmed before use. This typically requires the user to look up codes for each device to be controlled by the URC. The codes are often presented as a list of codes associated with equipment for different manufacturers. This requires the user to go through a number of programming attempts before identifying the correct code for a particular device. Additionally, the programming steps for most URCs are confusing and awkward because of the limited number and configuration of input buttons.

A further problem of existing URCs is the limited number of devices that can be controlled by a single URC. Often only one television may be programmed into the URC because there is only one "TV" button. The user is limited to controlling only the number and types of devices that the URC is configured to support. For example, the keypad configuration and circuitry for a URC may be limited to controlling just one television, a cable box, and a DVD player.

SUMMARY OF THE INVENTION

Embodiments of the invention provide a controller mechanism that automatically detects which device a user intends to control. An on-board camera detects which device the controller is pointed toward. The camera output is fed to a video analytic engine that compares the image content with a pre-defined set of images. When a match is found, the controller automatically loads settings for the matched device. After loading those settings, any key presses by the user will generate commands associated with the matched device.

A pre-defined set of images is populated as part of an initial configuration for each device that the user intends to command using the controller. For example, initial configuration to add a new device to the controller may be easily achieved by powering on the device to be controlled, pointing the controller's camera at the device so that it gets a good view of the device, allow the camera to obtain an image of a uniquely identifying feature (e.g., brand name, device shape, background color, etc.), search a database for devices having that unique feature, and automatically load the settings for the device that matches the unique feature.

During normal operation, the user simply points the controller's camera at the device to be controlled. Using an image captured by the camera, the device to be controlled is identified by comparing the image to a database of configured devices. Once the device is identified, the controller automatically loads the correct settings corresponding to that device.

BRIEF DESCRIPTION OF THE DRAWINGS

Figure 1:
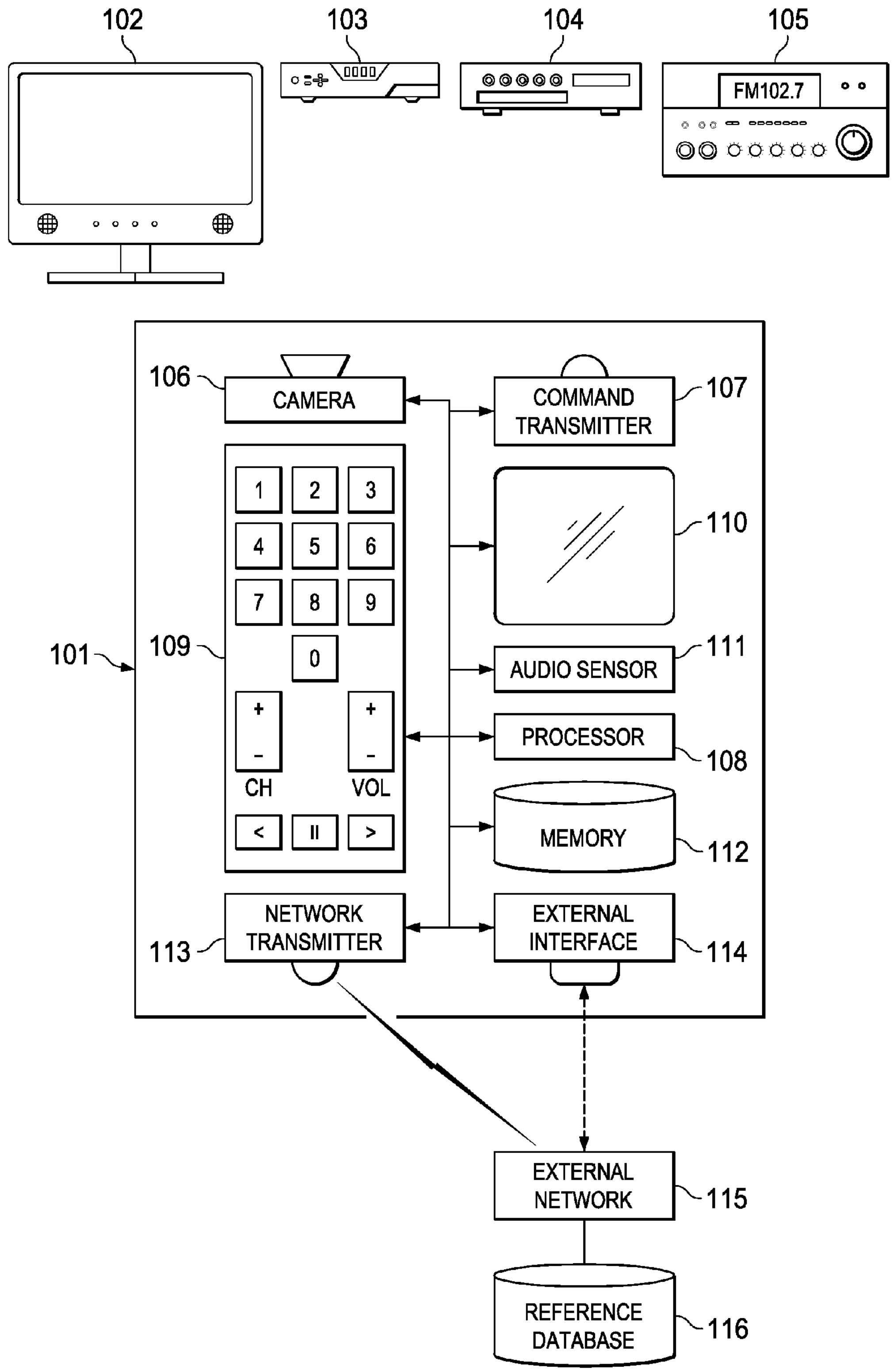

Having thus described the invention in general terms, reference will now be made to the accompanying drawings, wherein:

FIG. 1 is a block diagram illustrating a universal remote control (URC) according to one embodiment.

Figure 2:
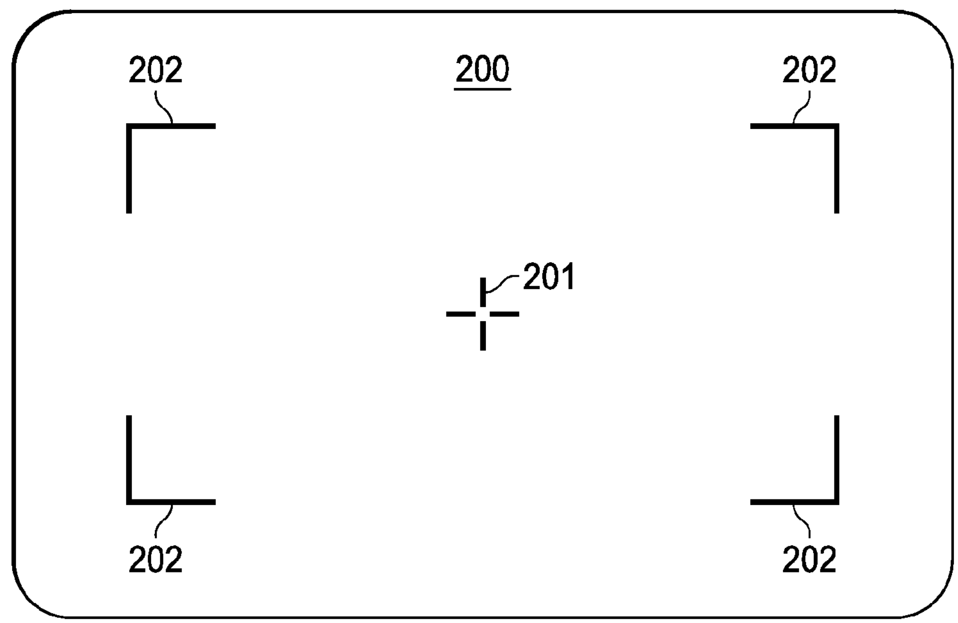

FIG. 2 illustrates a display for a URC in one embodiment.

Figure 3:
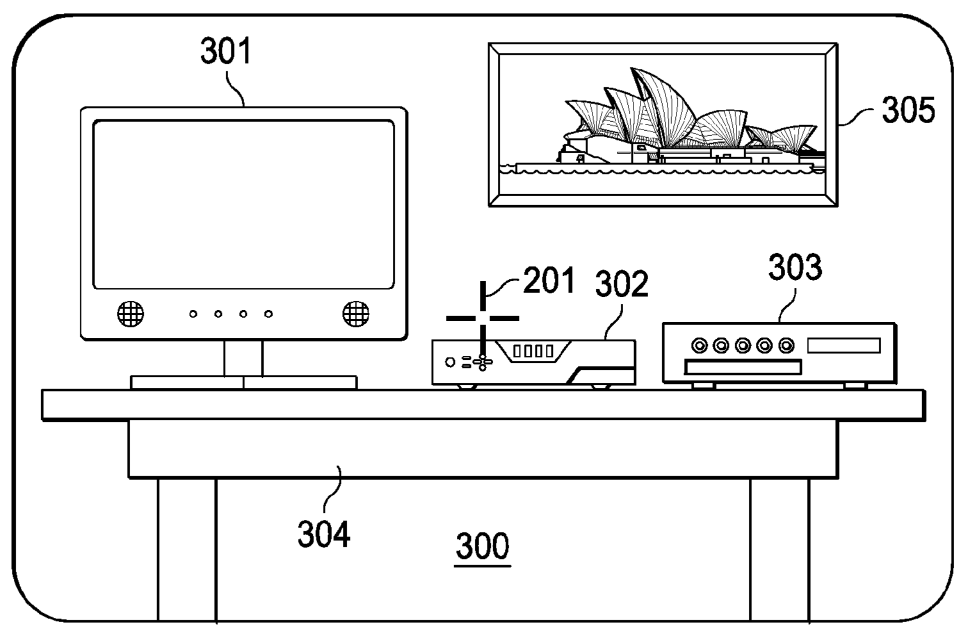

FIG. 3 illustrates an example display for a URC that is being pointed at one or more devices to be controlled.

Figure 4:
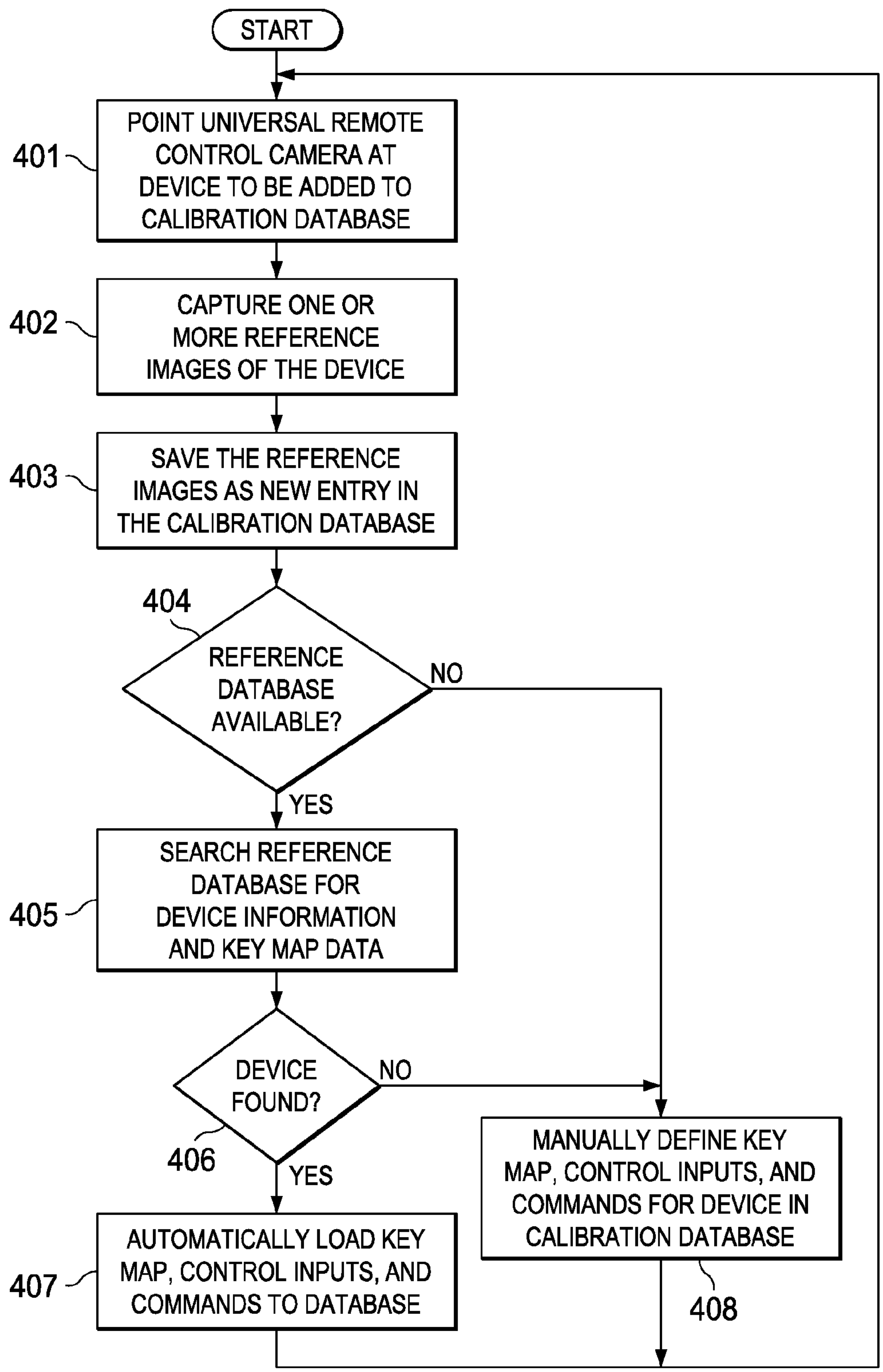

FIG. 4 is a flowchart illustrating a method or process for building a calibration database of devices to be controlled by the URC.

Figure 5:
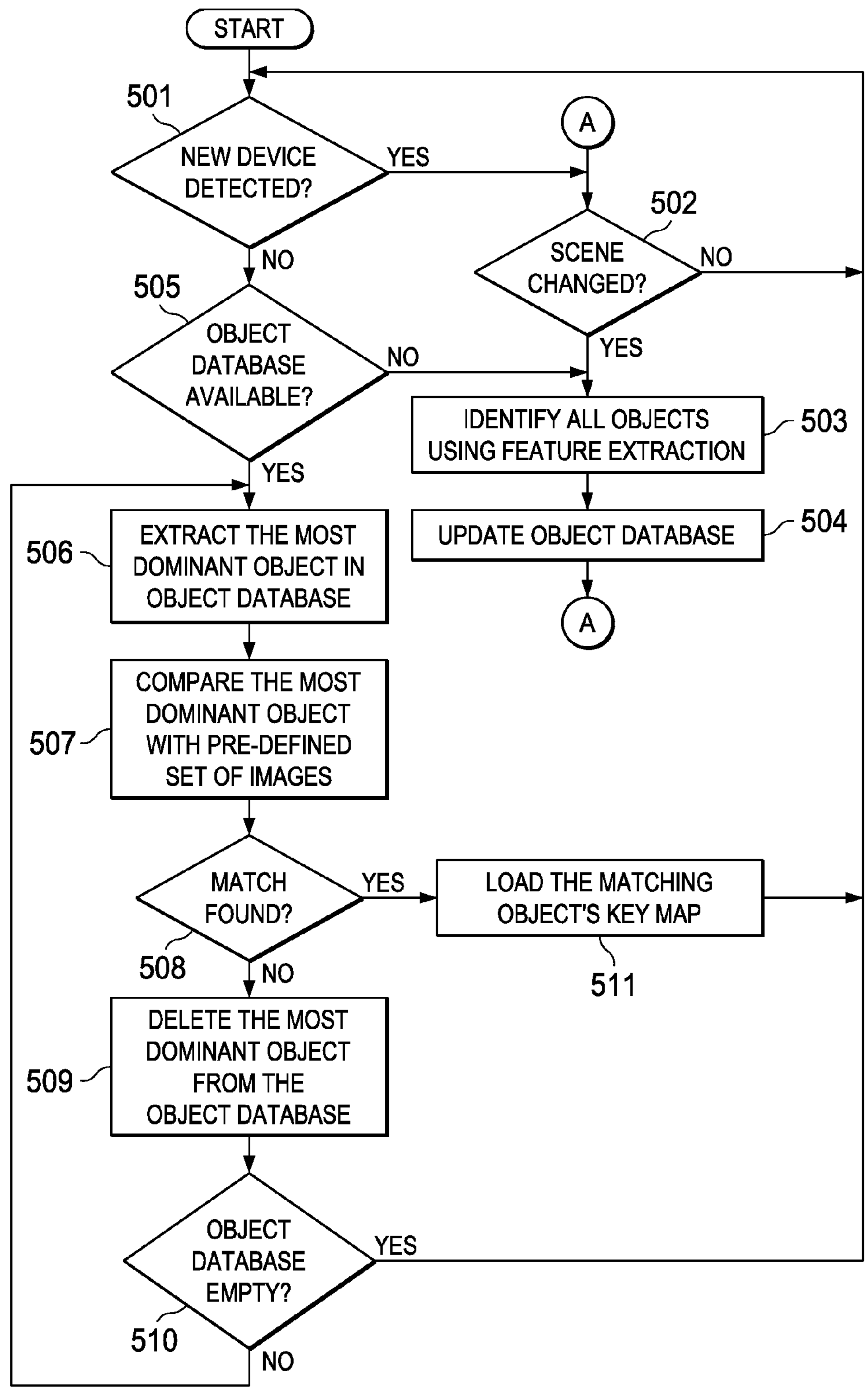

FIG. 5 is a flowchart illustrating a process or method for operating the URC at runtime.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a block diagram illustrating a universal remote control (URC) according to one embodiment. URC 101 may be used to control a number of other devices, such as a television 102, cable box 103, audiovisual equipment 104, and stereo equipment 105. Any number of devices 102-105 may be controlled using URC 101.

URC 101 includes a camera 106 that is oriented so that when a user points URC 101 at a device 102-105, the camera 106 will be aimed at the device of interest. In one embodiment, a lens for camera 106 may be positioned on one end of URC 101 so that the user controls the field of view of the camera 106 by pointing that end of URC 101 at the device to be controlled.

A command transmitter 107 in URC 101 generates command signals to control devices 102-105 in response to user inputs. Command transmitter 107 provides wireless operation commands to devices 102-105. Command transmitter 107 may be adapted to generate commands using one or more formats, protocols or technologies. Alternatively, multiple command transmitters 107 may be incorporated into URC 101 to support different technologies. For example, command transmitter 107 may generate infrared (IR) or other light signals using an LED or other light source. A command transmitter 107 may also generate radio frequency (RF) signals, such as Bluetooth or WiFi (e.g., signals complying with the IEEE 802.11 or similar standard) signals, and/or ultrasonic signals to control a broad range of devices 102-105.

Processor 108 receives inputs from camera 106 and determines which device is intended for control, such as a device most near to center of the camera's field of view. Processor 108 then directs command transmitter 107 to generate the appropriate commands for that device based upon the user's inputs. The user may input commands using a keypad 109, a touchscreen 110 or any other manual input, such as a trackball, buttons, switches, etc. The user may also use audible commands, such as voice commands, that are detected using an audio sensor 111.

Touchscreen 110 may be used to present information to the user, such as the image currently in the field of view of camera 106, a list of previously configured devices, additional control inputs, soft buttons, icons, etc. In one embodiment, for example, URC 101 does not include a keypad 109 but instead uses touchscreen 110 to present input options, such as soft keys, buttons, or other inputs, appropriate to the device being controlled.

Memory 112 may store software instructions for processor 108 and/or other data, such as image data and control commands for known devices. Memory 112 may include computer storage media in the form of volatile and/or nonvolatile memory such as read only memory (ROM) and random access memory (RAM). Memory 112 may also hold an operating system, application programs, and other program modules and program data. By way of example only, memory 112 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media.

The information for devices to be controlled by URC 101 may be loaded from remote sources, such as from remote databases, via an external network. URC 101 may communicate with external networks using a wireless network transmitter 113 or via a wired connection to an external interface 114. For example, URC 101 may communicate with external network 115, which may be a data network, such as the Internet, an intranet, a home network, or any public or private data network. URC 101 may communicate with external network 115 wirelessly, such as by using a WiFi, Bluetooth, IR, or RF transmitter 113, or via a wired connection, such as a USB or other cable connected to interface 114. Through external network 115, URC 101 may access additional resources, such as a reference database 116 that stores device data, key maps, and other information.

URC 101 may be specifically designed to operate as a universal remote control with components selected for that purpose. In other embodiments, URC 101 may be a general purpose or special purpose computing system that is programmed to operate as a universal remote control. Examples of well-known computing systems that may be suitable for use with the invention include, but are not limited to: smartphones, PDAs, hand-held or laptop devices, and tablet computers.

The controlled devices 102-105 illustrated in FIG. 1 are merely examples of broad categories of devices that can be controlled using the systems and methods disclosed herein. Devices 102-105 may be from any manufacturer and may include any model, style, version, or configuration that complies with any protocol or standard. Additionally, any number of a particular type of devices may be controlled using URC 101. For example, URC 101 may control one or more televisions 102 or other displays. The televisions may be either of the same type or different models from various manufacturers. Other objects in addition to entertainment devices may be controlled using URC 101, such as, for example, garage doors, fans, toys, etc.

FIG. 2 illustrates a display for a URC in one embodiment. The display 200 presents the image captured by the URC camera so that the user can select a device to control. Display 200 may include aiming guides, such as a reticle or crosshairs 201 or framing guidelines 202, that help the user position the device to be controlled in the center of the camera's field of view. In other embodiments, different aiming guide configurations or no aiming guide at all may be presented.

FIG. 3 illustrates an example display for a URC that is being pointed at one or more devices to be controlled. Display 300 shows devices in the camera field of view, such as a television 301, cable box 302, and DVD player 303 sitting on a table 304. Reticle 201 indicates the center of the field of view and may be used to position the URC camera. In other embodiments, the user may select a zoom option on the URC to zoom the camera so that a desired device fills more of display 300, which would allow for more accurate identification of a selected device. The display 300 also shows other objects in the field of view, such as a picture 305.

The URC utilizes its onboard camera to automatically detect the device that the remote is pointed at by the user. When the URC camera is pointed at a device, an image can be captured of the device in the field of view. In one embodiment, the user may cause the camera to capture the image, such as by pushing a button or entering some other input. In other embodiments, the URC may automatically capture images from the camera. Such automatic image capture may be triggered, for example, when the URC is being held by the user or when devices are recognized in the field of view.

The URC maintains a calibration database of devices that can be controlled. The database entries comprise one or more images of each device and a key map for the device. The key map identifies the possible user inputs that the device will accept and the associated commands (e.g., IR or Bluetooth signals) that the URC should generate to control the device. The calibration database may be stored onboard inside the URC memory 112 (FIG. 1), for example.

The URC may have a preconfigured calibration database that is provided by the manufacturer with a list of common or popular devices that are likely to be used in conjunction with the URC. The preconfigured calibration database may be stored on the URC by the manufacturer or may be accessible by the user via an external network. In other embodiments, prior to using the URC, the user may have to build or add to the calibration database by adding the user's devices.

FIG. 4 is a flowchart illustrating a method or process for building a calibration database of devices to be controlled by the URC. Before using the URC, the user must first add his or her devices to the calibration database. In step 401, the user points the URC camera at a device that he or she wants to control with the URC. In step 402, the URC captures one or more images of the device using the camera. The user may command the URC to capture the images, such as by pressing an image-capture button on the URC, or the URC may automatically capture images of the device when the URC is in a calibration mode. The images of the device captured in step 402 may be taken from different angles and points of view to maximize the URC's ability to later recognize the device. In one embodiment, several variants of the device images are generated with different scaling and rotation angles to cover scenarios where user points remote to a device from a different distance or angle.

In step 403, the images are saved as a new entry in the calibration database. In step 404, the URC evaluates whether a reference database is available to search for information and key map data for the device. The reference database and/or the contents of the reference database may be provided, for example, by a device manufacturer, the URC manufacturer, or by third-parties, such as other users. The reference database may be searched for entries similar to the captured images using content-based image retrieval or computer vision, for example. The reference database may be external to the URC, such as database 116 (FIG. 1), or preloaded on the URC. Although one reference database 116 is illustrated to simplify the figures, it will be understood that the URC may access multiple reference databases in other embodiments.

If a reference database is available, then the URC searches the database in step 405. In step 406, the URC evaluates whether the device was found in the reference database. This step may provide the user with information about the reference database entry, such as picture of the reference device, to allow the user to confirm that the device was found in the reference database. If the device was found, then in step 406, the URC automatically loads key map, control input, and command data to its calibration database for the device in step 407. This information will allow the URC to control the device and to present the user with an appropriate list of input options associated with the device. For example, if the device is a cable box, then a key map that would allow the user to turn the device on and off and change channels would be added to the calibration database. Depending on the particular cable box device, the key map may also allow the user to adjust volume, select an input video source, operate DVR functions, and access other extended features. The process then returns to the start to allow additional devices to be entered and calibrated.

If the reference database is not available in step 404 or if the device image is not found in the reference database in step 406, then the process moves to step 408 where the user may manually define a key map, control inputs, and other commands for the device in the calibration database. The process then returns to the start to allow additional devices to be entered and calibrated.

FIG. 5 is a flowchart illustrating a process or method for operating the URC at runtime. In step 501, the URC evaluates whether a new device has been detected within the camera's field of view. A new device may be detected or suspected if the user moves the URC or initiates a search function, or if the image from the camera changes (e.g., a scene change). If a new device has been detected, then the process moves to step 502 where the URC evaluates whether the scene viewed by the camera has changed. If the scene has changed (i.e., the URC is pointed in a new direction or if a new device is in the center of the field of view), then the URC performs object detection in step 503 by identifying all objects within the camera's field of view. The object detection maybe performed using edge detection, feature extraction, or other processes in which the image is analyzed to identify all possible devices. For example, any rectangular object within the field of view may be isolated as a possible device to be controlled by the URC. Once the objects have been detected in step 503, they are added to an object database in step 504.

The process then moves back to step 502 where the URC determines if the scene captured by the camera has changed again. If the scene has changed (e.g., the URC camera is pointing in a different direction), then the process repeats steps 503 and 504 to add any new objects to the object database. If the scene has not changed, then the process returns to the start and waits for new devices to be detected.

In step 501, if a new device has not been detected, then the URC evaluates whether an object database is available yet in step 505. If the object database has not been created, then the process moves to step 503 to begin building an object database from any objects in the current field of view.

If the object database is available in step 505, then an object-selection process begins in step 506. The URC extracts the most dominant object from the object database in step 506. The most dominant object may be selected, for example, as the object closest to the center of the field of view, the largest object in the field of view, or some other prioritization method.

The most dominant object is then compared to a predefined set of images in step 507. This set of images may be found in the calibration database, for example. The URC attempts to match the image of the most dominant object in the object database to one of the images in the predefined set of images. In step 508, the URC evaluates whether a match has been found.

If a match is not found, then the URC deletes the most dominant object from the object database in step 509. If there are objects remaining in the object database in step 510, then the process returns to step 506 and again extracts the most dominant object in the object database, which is a new object because the previous most dominant object was deleted. The process continues looping through steps 506-508 until a match is found between the image of the most dominant object and an image in the pre-defined set of images. If the object database is empty at step 510, then the process returns to the start.

If a match is found at step 508, then key map and other relevant data is loaded for the matching image in step 511. The URC then switches to a user control mode that allows the user to control the device using the key map loaded into the URC. The process returns to the start to detect additional devices or scene changes. The URC will continuously scan the camera image for scene changes so that a new device is automatically selected if the user points to a different device.

Using object recognition, the URC automatically selects the target device without requiring manual intervention from the user and also addresses the limitation of existing URCs, which have restrictions on the number and type of devices to be controlled. This allows the user to simply point the URC camera toward the desired device, and then control that device using the key map automatically loaded by the URC after matching the device to stored images.

The URC may be a dedicated remote control device or a smartphone or other device running a URC application. The user interface is not limited to any particular configuration, but can be modified based upon the device to be controlled. The URC only has to present the user with the control options or soft buttons that actually work with the selected device.

Referring to FIG. 3, an example implementation of the flowchart shown in FIG. 5 is described below. A user points the URC camera at a cable box 302. The scene captured by the camera includes television 301, DVD player 303, table 304, and picture 305. When the URC is pointed at television 301, it identifies a new device (501) and changed scene (502). The URC begins identifying all objects in the scene (503) and then updates an object database (504) with images of the television 301, cable box 302, DVD player 303, table 304, and picture 305.

Because the scene has not changed (502), the process returns to the start. A new device is not detected (501) and the object database has been created (505) and includes the objects shown in display 300. The URC then extracts the most dominant object in the object database (506), which may be cable box 302 because it is closest to the center of the field of view. The image of the cable box 302 is compared to a pre-defined set of images (507), such as a calibration database.

If, for example, the user has not configured the URC to operate the cable box 302, then there will not be a match (508). The URC will then delete the cable box 302 from the object database (509). The next most dominant object will be extracted from the object database (506). This time the television 301 may be selected as the most dominant object if, for example, it is the next closest object to the center of the field of view or if it is the next largest object. The television 301 image is then compared to the calibration database (507). If the user has already configured the URC to control the television 301, then there will be a match (508) and the URC will load a key map (511). The television 301 can now be controlled with the URC.

In other embodiments, the URC may first identify a non-controllable object, such as picture 305, as the most dominant object. Because the user has not configured the URC to operate this object, the process of FIG. 5 will automatically eliminate this picture 305 because it will not match an image in the configuration database.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. A method for controlling a plurality of devices, comprising:

capturing an image of a scene including one or more objects using a camera on a controller;

identifying the one or more objects in the image, by the controller;

storing images for each of the identified one or more objects to an object database;

comparing a common property of each of the one or more objects with one another, the common property being detectable by the controller, to select an object image corresponding to one of the one or more objects in which the common property is the most dominant relative to the others of the one or more objects in accordance with a prioritization criteria, by the controller;

extracting the selected object image from the object database, by the controller;

comparing the selected object image to a database of images for preconfigured devices, by the controller;

determining whether the selected object image matches a preconfigured device image in the database of images for preconfigured devices, by the controller; and when the selected object image matches a preconfigured device image, loading a key map for a preconfigured device corresponding to the preconfigured device image matching the selected object image on the controller.

2. The method of claim 1, further comprising:

when the selected object image does not match a preconfigured device image in the database of images for preconfigured devices, using the controller to delete the selected object image from the object database.

3. The method of claim 2, comprising, using the controller to:

when the selected object image does not match a preconfigured device image in the database of images for preconfigured devices, select a next object image corresponding the one of the one or more objects in which the common property is the next most dominant in accordance with the prioritization criteria;

extract the selected next object image from the object database;

compare the selected next object image to the database of images for preconfigured devices;

determine whether the selected next object image matches a preconfigured device image in the database of images for preconfigured devices; and when the selected next object image matches a preconfigured device image, load a key map for a preconfigured device corresponding to the preconfigured device image that matches the selected next object image on the controller.

4. The method of claim 3, comprising, when the selected next object image does not match a preconfigured device image in the database of images for preconfigured devices, using the controller to delete the selected next object image from the object database.

5. The method of claim 1, further comprising:

determining that the scene captured by the camera has changed;

capturing a new image using the camera;

identifying one or more new objects in the new image; and storing images for the one or more new objects to the object database.

6. The method of claim 1, wherein the key map identifies user inputs corresponding to the preconfigured device.

7. The method of claim 1, wherein the key map identifies controller commands used to control the preconfigured device.

8. The method of claim 7, wherein the controller commands are selected from infrared, Bluetooth, and ultrasonic commands.

9. The method of claim 1, further comprising:

displaying user inputs associated with the preconfigured device on the controller.

10. The method of claim 1, wherein the common property that is compared is the size of each of the one or more objects.

11. A controller, comprising:

a database storing images of preconfigured devices that the controller can operate;

a camera configured to capture images of objects in a camera field of view; and a processor configured to:

store the captured images of the objects in an object database;

match the images of the objects in the field of view to images of preconfigured devices in the database of images of preconfigured devices, the images of the objects being selected for matching in an order that is determined based on a property common to each of the images of the objects in accordance with a prioritization criteria, with images of the objects exhibiting the property more dominantly being selected from the object database for matching against the database of images of preconfigured devices before images of the objects exhibiting the property less dominantly, the property being detectable by the controller;

load key maps associated with matched preconfigured devices; and eliminate images of objects from the object database that do not match any of the images of preconfigured devices in the database of images of preconfigured devices.

12. The controller of claim 11, further comprising:

a user interface configured to accept control inputs corresponding to the key map.

13. The controller of claim 12, wherein the user interface is a touchscreen configured to display input options for selection by the user.

14. The controller of claim 12, wherein the user interface is a key pad.

15. The controller of claim 11, further comprising:

a command transmitter configured to transmit control signals for the selected preconfigured device.

16. The controller of claim 11, further comprising:

an external interface configured to access an external reference database via an external network.

17. The controller of claim 11, wherein the property common to each of the images of the objects is a size of each of the objects.

18. The controller of claim 11, wherein the property common to each of the images of the objects is not a distance to the center of the field of view.

19. A controller, comprising:

a database storing images of preconfigured devices that can be operated by the controller;

a camera configured to capture images of a plurality of objects in a camera field of view; and a processor configured to:

match the images of the objects in the field of view to images of preconfigured devices in the database, the images of the objects being selected for matching in an order that is determined based on a property common to each of the images of the objects in accordance with a prioritization criteria, with images of the objects exhibiting the property more dominantly being selected before images of the objects exhibiting the property less dominantly, the property being the size of each of the objects; and load key maps associated with matched preconfigured devices.

20. The controller of claim 19, wherein objects having a larger size relative to other objects are identified as exhibiting the property more dominantly with respect to the other objects.

* * * * *